US012645981B2

(12) United States Patent
Sabharwal et al.

(10) Patent No.: US 12,645,981 B2
(45) Date of Patent: Jun. 2, 2026

(54) UNIFIED MACHINE LEARNING FEATURE DATA PIPELINE

(71) Applicant: Etsy, Inc., Brooklyn, NY (US)

(72) Inventors: Aakash Sabharwal, San Francisco, CA (US); Akhila Ananthram, San Francisco, CA (US); Miao Wang, San Francisco, CA (US); Ruixi Fan, Jersey City, NJ (US); Sarah Hale, Santa Clara, CA (US); Chu-Cheng Hsieh, San Jose, CA (US); Tianle Hu, South San Francisco, CA (US)

(73) Assignee: Etsy, Inc., Brooklyn, NY (US)

( * ) Notice: Subject to any disclaimer, the term of this patent is extended or adjusted under 35 U.S.C. 154(b) by 1291 days.

(21) Appl. No.: 17/235,441

(22) Filed: Apr. 20, 2021

(65) Prior Publication Data

US 2022/0114483 A1 Apr. 14, 2022

Related U.S. Application Data

(60) Provisional application No. 63/090,088, filed on Oct. 9, 2020.

(51) Int. Cl.
| | |
|---|---|
| *G06N 20/00* | (2019.01) |
| *G06F 16/22* | (2019.01) |
| *G06F 18/214* | (2023.01) |

(52) U.S. Cl.
CPC ........... *G06N 20/00* (2019.01); *G06F 16/221* (2019.01); *G06F 18/2148* (2023.01)

(58) Field of Classification Search
CPC ... G06N 20/00; G06F 16/221; G06F 18/2148; G06F 16/9536; G06V 10/7747; G06Q 30/0631
See application file for complete search history.

(56) References Cited

U.S. PATENT DOCUMENTS

| | | | | |
|---|---|---|---|---|
| 9,996,804 | B2 | 6/2018 | Bowers et al. | |
| 11,080,283 | B1 * | 8/2021 | Wondo | G06F 16/9574 |
| 11,195,023 | B2 * | 12/2021 | Lloyd, II | G06F 18/2148 |
| 11,343,352 | B1 * | 5/2022 | Golden | H04L 67/60 |

(Continued)

OTHER PUBLICATIONS

Chen, Ye, Behavioral Targeting: The Art of Scaling Up Simple Algorithms, Oct. 2010, ACM Transactions on Knowledge Discovery from Data, vol. 4, No. 4, Article 17, (Year: 2010).*

(Continued)

*Primary Examiner* — Brian M Smith
(74) *Attorney, Agent, or Firm* — Fish & Richardson P.C.

(57) ABSTRACT
A unified system with a machine learning feature data pipeline that can be shared among various product areas or teams of an electronic platform is described. A set of features can be fetched from multiple feature sources. The set of features can be combined with browsing event data to generate combined data. The combined data can be sampled to generate sampled data. The sampled data can be presented in a format having a structure that is agnostic to a feature source from which the set of features was fetched. The sampled data can be joined with old features by a backfilling process to generate training data designed to train one or more machine learning models. Related methods, apparatuses, articles of manufacture, and computer program products are also described.

18 Claims, 8 Drawing Sheets

(56)　　　　　References Cited

U.S. PATENT DOCUMENTS

| | | | | |
|---|---|---|---|---|
| 11,783,206 | B1 * | 10/2023 | Makwana .............. | G06N 20/10 |
| | | | | 706/12 |
| 2015/0379424 | A1 * | 12/2015 | Dirac .................... | G06N 20/00 |
| | | | | 706/12 |
| 2018/0240152 | A1 * | 8/2018 | Mookherjee ....... | G06Q 30/0256 |
| 2020/0005045 | A1 | 1/2020 | Lloyd et al. | |
| 2021/0374127 | A1 * | 12/2021 | Mavrommatis ......... | G06F 9/541 |

OTHER PUBLICATIONS

Hu et al., "Reinforcement Learning to Rank in E-Commerce Search Engine: Formalization, Analysis, and Application," <https://arxiv.org/pdf/1803.00710.pdf>, May 2018, 10 pages.

PCT International Search Report and Written Opinion in International Appln. No. PCT/US2021/053494, dated Jan. 28, 2022, 13 pages.

Zhao et al., "Deep Reinforcement Learning for Page-wise Recommendations," <https://arxiv.org/pdf/1805.02343.pdf>, Aug. 2018, 9 pages.

International Preliminary Report on Patentability in International Appln. No. PCT/US2021/053494, mailed on Apr. 20, 2023, 8 pages.

* cited by examiner

UNIFIED MACHINE LEARNING FEATURE DATA PIPELINE

RELATED APPLICATION

This disclosure claims priority to U.S. Provisional Patent Application Ser. No. 63/090,088, filed on Oct. 9, 2020, the entire contents of which are incorporated herein by reference.

TECHNICAL FIELD

The subject matter described herein relates to a unified system with a machine learning (ML) feature data pipeline that can be shared among various product areas or teams of an electronic platform.

BACKGROUND

Pushing a machine learning prototype too often requires customized machine learning feature pipelines to be setup properly to ensure consistent and effective data flow. A pipeline, also known as a data pipeline, is a set of data processing elements connected in series, where the output of one element is the input of the next one. The elements of a pipeline are often executed in parallel or in time-sliced fashion. In practice, most machine learning solutions come with customized data pipelines that are both fragile (e.g. pipelines may not be able to input up to date information in real-time, thereby resulting in inaccurate machine learning models) and difficult to maintain (e.g. an electronic platform requires multiple customized pipelines to support various products such as search ranking, item recommendation, and digital components as that site grows to a large scale over time, and maintenance of these pipelines is computationally intensive and time consuming.

SUMMARY

When developing machine learning (ML) pipelines, training instance collection, and feature computation generally require a large amount of development, memory, and processing resources. Without a uniform data strategy, these tasks are usually duplicated across pipelines, thereby resulting in a multiplication of memory and processing resources required to support multiple machine learning models. In order to minimize the wastage of both computation and development efforts, a shared ML feature data pipeline is described that allows the following aspects: (1) real-time logging, log-based training, (2) sharing features, (3) shared schema, and (4) back-fill process, which are explained below.

With respect to aspect (1) above, in order to minimize training-serving skew (which involves features used at training time being inconsistent with those used at inference time), real-time logging is adopted to capture the true state of features used at inference time so that the same dataset can be used for both serving and training. At request time, the production system will query a low-latency service to fetch all features required for a model for inference and then log those values in real time. Additionally, log-based training allows inclusion of features based on the timestamp of related events, and such logging of time-stamped data simplifies the process of including features that are updated in real-time, also known as real-time features. On large scale electronic platforms (e.g. electronic commerce websites), recent user activities and in-session data are used to make ML models more accurate and personalized.

With respect to aspect (2) above, sharing features across teams helps accelerate ML adoption across different product teams without requiring duplication of the feature set, which would cost orders of magnitude greater memory and processing resources. For example, without a common feature system different teams often waste expensive resources in computing similar features repeatedly. Furthermore, providing a shared system through which only minimal changes are required to add additional features for model training/inference is powerful in accelerating ML adoption in different use cases, as different teams can share features built by each other.

With respect to aspect (3) above, lack of data consistency can lead to quality issues, which can incur large costs for ML systems. Poor data quality generally results in a feedback cycle of poor ML input and output, thereby reducing the effectiveness of machine learning models. In order to improve data quality and consistency, establishing a shared schema standardizes the data format and helps diagnose common data quality issues such as invalid types, missing features or out-of-range values in early stages. Proper schemas also help simplify ML systems without having to update multiple pieces of the pipeline with every change, which results in a system that is more robust and efficient than systems that don't use a shared schema across machine learning models. Having a common schema also allows different ML models to share training data, e.g. search ranking and recommendations model can share training instances, helping models train and learn on more different types of data, which can sometimes make them more accurate.

With respect to aspect (4) above, while real-time logging provides more consistency in training and serving systems, it also introduces the need for longer front-filling, where there is a longer wait period to collect the full training data. Back-filling can allow new features quickly so that training data can be obtained faster, thereby enabling the use of more real-time information (e.g., information obtained between scheduled system updates) while avoiding the issues associated with front-filling.

The implementations described herein describe an abstraction layer is introduced by refactoring common components into a unified system that includes a centralized feature store, a feature logger, and feature attributor. Such a unified system includes a shared ML feature data pipeline that facilitates the above-noted aspects of real-time logging, log-based training, sharing features, shared schema, and back-fill process.

In one aspect, a method is described that can include the following. One or more data processing apparatuses (which can include one or more processors) can fetch, over a network, a set of features from a plurality of feature sources. The one or more data processing apparatuses can construct, using the set of features, a set of training data having a structure that is agnostic to a source from which the features were received. The one or more data processing apparatuses can detect one or more of (i) a change to a given feature among the set of features that has not been logged in the set of features or (ii) a new feature that has not been logged in the set of features. The one or more data processing apparatuses can regenerate, prior to logging of the change to the given feature or the new feature, the set of training data by joining the set of training data with the changed given feature or the new feature. Prior to logging the change to the given feature or the new feature, the one or more data processing apparatuses can provide (e.g. output) the regenerated set of training data to train a given machine learning model. The given machine learning model can be trained using that regenerated set of training data.

In another aspect, a system is described that can include at least one programmable processor, and a machine-readable medium storing instructions that, when executed by the at least one programmable processor, cause the at least one programmable processor to perform operations comprising: fetching, over a network, a set of features from a plurality of feature sources; constructing, using the set of features, a set of training data having a structure that is agnostic to a source from which the features were received; detecting (i) a change to a given feature among the set of features that has not been logged in the set of features or (ii) a new feature that has not been logged in the set of features; regenerating, prior to logging of the change to the given feature or the new feature, the set of training data by joining the set of training data with the changed given feature or the new feature; and training, prior to logging the change to the given feature or the new feature, a given machine learning model using the regenerated set of training data.

In yet another aspect, one or more non-transitory computer program products are described that can store instructions that, when executed by at least one programmable processor, cause the at least one programmable processor to perform operations comprising: fetching, over a network, a set of features from a plurality of feature sources; constructing, using the set of features, a set of training data having a structure that is agnostic to a source from which the features were received; detecting (i) a change to a given feature among the set of features that has not been logged in the set of features or (ii) a new feature that has not been logged in the set of features; regenerating, prior to logging of the change to the given feature or the new feature, the set of training data by joining the set of training data with the changed given feature or the new feature; and training, prior to logging the change to the given feature or the new feature, a given machine learning model using the regenerated set of training data.

In some implementations, one or more of the following can be implemented either individually or in any feasible combination. The constructing of the set of training data comprises: combining the set of features with a browsing event data to generate combined data; sampling the combined data to generate sampled data, wherein the sampled data is presented in a format having a structure that is agnostic to a feature source from which the set of features was fetched; and joining the sampled data with old features by a back-filling process to generate training data designed to train one or more machine learning models. The one or more machine learning models can be configured to be used to make predictions for respective one or more product areas of an electronic platform. The sampling can include stratified sampling that applies weights to the set of features within the combined data. The weights can vary based on one or more of recency or frequency of the browsing activity. The set of features can include (i) batch features and (ii) streaming features that are updated more often than the batch features. The batch features can be stored in a first set of columns, the streaming features can be stored in a second set of columns, and the second set of columns can be updated more often than the first set of columns.

The subject matter described herein provides many advantages. The unified system described herein advantageously reduces the complexity, memory and processing resources, and the frequency of updates required to train and maintain multiple different (e.g., disparate or separately defined) machine learning solutions at scale. The unified system described herein advantageously reduces or eliminates data inconsistency that can be caused due to use of different pipelines. Reduction or elimination of data inconsistency can avoid the disadvantages of inconsistent data. The disadvantages of inconsistent data include (a) training-serving skew, which involves features used at training time being inconsistent with those used at inference time, which can often nullify the benefits of machine learning modeling, (b) difficult-to-share training data, as training data stored in different schemas in the system can create duplication and prevent re-usability, which in turn can make it difficult to train a model on both web and mobile traffic if they have different schemas, and (c) impaired data quality, where lacking data validation and schema enforcement can introduce unforeseeable or undetectable bugs in production that are hard to trace and fix, which in turn can result in inferior or incorrect inference by the machine learning model.

In addition, the unified system described herein advantageously reduces or eliminates data inefficiency that can be caused by repeatedly processing the same data with different pipeline jobs, or extract, transform, load (ETL) processes that can result in similar and redundant outputs. This duplication due to similar or redundant outputs can substantially increase both computational and storage costs, particularly if the process includes an expensive operation such as SQL outer join, large scale map-reduce shuffle, or the like, which in turn negatively affects latency, cost and capacity planning.

Furthermore, the unified system described herein advantageously allows a satisfactory user experience by (a) enhancing feature discoverability so that users (e.g. data scientists) can easily determine existing effective features so as to enhance machine learning output, (b) lowering developer burden by storing all of the data in a common format, and (c) allowing extensibility, i.e. when users have to make non-trivial modifications to jobs performing complicated joins, the unified system decreases the time it takes to validate the changes by the users.

The details of one or more variations of the subject matter described herein are set forth in the accompanying drawings and the description below. Other features and advantages of the subject matter described herein will be apparent from the description, drawings, and claims.

DETAILED DESCRIPTION

Figure 1:
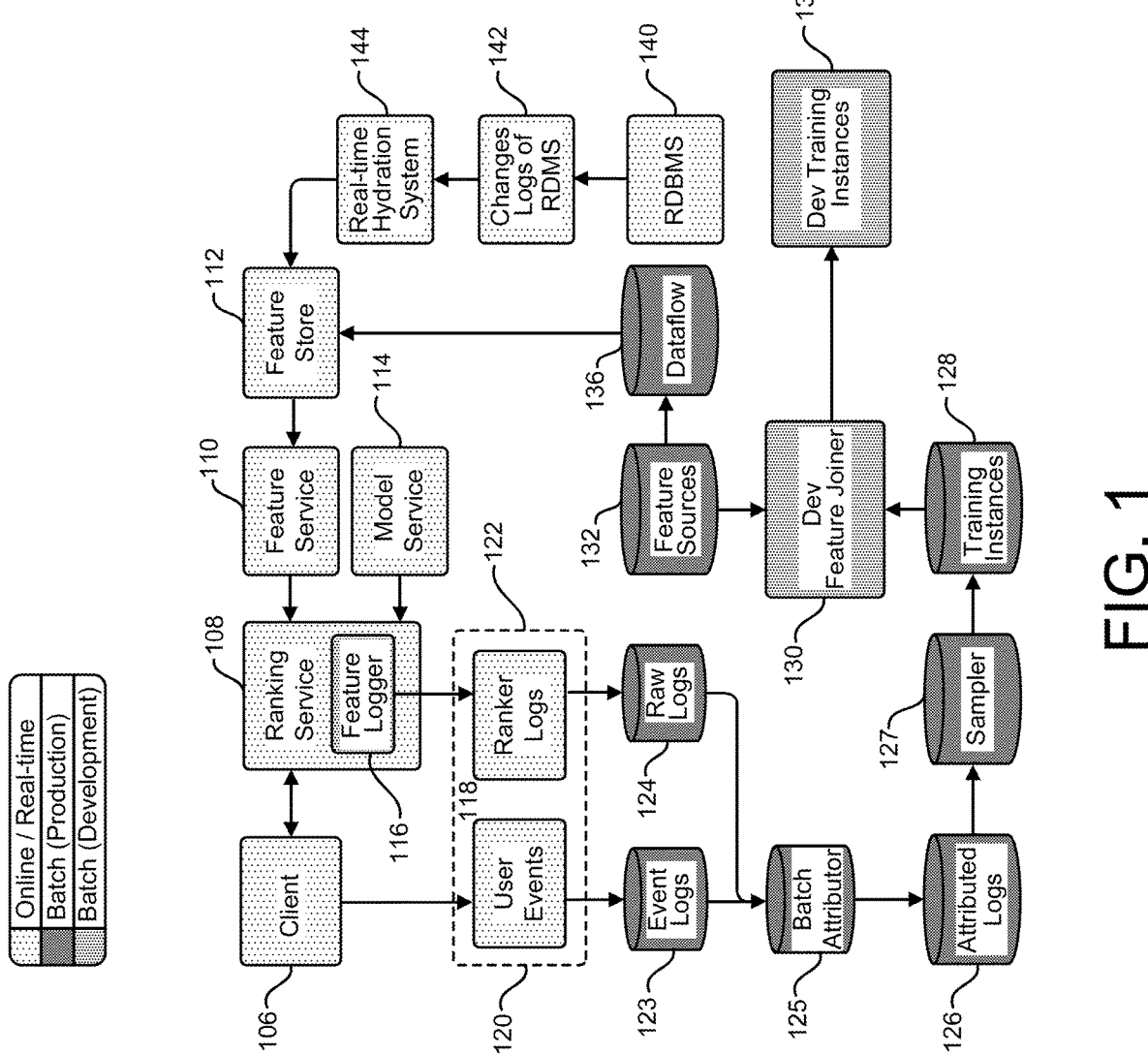
FIG. 1 illustrates an example unified system with a machine learning (ML) feature data pipeline that is shared among various product areas or teams of an electronic platform (e.g. website).

FIG. 1 illustrates a unified system 102 with a machine learning (ML) feature data pipeline that is shared among various product areas or teams of an electronic platform (e.g. website), such as search ranking, item recommendation, and digital components (e.g. advertisements). The term pipeline, as used herein, can also be referred to as a data pipeline. A data pipeline is a set of data processing elements connected in series, where the output of one element is the input of the next one. The elements of a pipeline can be executed in parallel or sequentially, both in a pre-scheduled manner or in real-time (e.g. when users come to or access the electronic platform).

An application installed on a client device 106 can display various aspects of an electronic platform, which in some implementations can also be referred to as an online platform. The electronic platform can take many forms, and support many functions across various development groups of a technology company. For example, the electronic platform may include various different technology development groups that develop and implement machine learning models that support and/or enable different aspects of services offered by the technology company. In many situations, the different development groups work independently of each other, and develop their models without coordinating with the other teams. In these types of situations, the disparate teams will often develop their own feature sets, using their own schema, and generate their own training data without consulting the other development teams in the company. As noted above, this can lead to the duplication of large amounts of data, reduce the efficiency of model development due to the fact that similar tasks are being performed by different groups, and reduce the efficiency of the system implementing the multiple models because of the redundancy in data storage and excess resources required to perform the similar tasks for different teams.

The electronic platform can take any form including platforms that use machine learning to solve biotechnology problems, computer networking problems, cloud computing problems, or any other problems to which machine learning can be applied. In some implementations, the electronic platform can be an electronic commerce platform, which can include aspects such as search ranking, recommendations (which can be personalized and/or discovery applications), presentation of digital components (e.g. advertisements), machine learning for image or style understanding of interest of the users, fraud and risk detection, content management capabilities, search engine optimized code and layout, reporting tools and custom report features, integrated blog or articles section, email outreach features or integration, multiple payment options, and/or the like. The application can be implemented in a browser or a native application. The application can identify a browsing activity by a user on the application. The browsing activity can be, for example, search of a particular item listed on the electronic platform, search of a particular online shop on the electronic platform, clicking on a particular item, hovering through and dwelling on listing pages or adding an item to the shopping cart of the user, purchasing an item by completing a transaction, and/or the like. The browsing activity can be associated with a product service of a plurality of product services implemented by the application.

The client device 106 can transmit, in response to identifying of the browsing activity, a query (which can be a specific request for data) from the application to the ranking service 108. The query can be indicative of the browsing activity performed by the user. The ranking service 108 can determine candidates that are specific to the query and/or personalized to the user. The candidates can be a preset number (e.g. top 1000) of things any user may be interested in. These candidates can be heuristically generated, or ML generated.

The feature service 110, which may interact with the ranking service 108, can determine one or more features for each candidate of the plurality of candidates. The features can be of different types, such as listing features, features for queries, features for providers (or shops) registered on the platform, features for the user whose browsing activity has been determined, and/or the like. The listing features can include a top query that results in a click, quantity of one or more listed items sold over past preset time, price of the listed item, material of the item, and/or the like. A feature for a query can be a type of product that is being queried by the user, classification tag for a query, number of tokens or words in a query, and/or the like. A feature for a provider or shop can be the number of items the provider or shop has sold in a preset time on the electronic platform. Features for a user can be any details of the user that the user has provided (e.g., account details of the user on the electronic platform, browsing history on the electronic platform, browsing patterns, and/or the like. Each feature can be represented in the form of a numeric value, a string, an embedding (which can include continuous vector representations for discrete variables), and/or the like. The feature service 110 can further determine (e.g. compute) the features.

The feature service 110 can store the one or more features for each candidate in a database (which can also be referred to as a feature store) 112 in a particular format that is readable by various (e.g. all) services provided by the platform, which may be developed and supported by different disparate development teams. The database 112 can be accessible by all such development teams, as discussed throughout this document. The database 110 can be a central distributed processing system.

The feature store 112 can be a column-based distributed non-relational (e.g. NoSQL) database—such as BIG-TABLE, DYNAMODB or HBASE—with independent columnar updates and a feature subset filtering mechanism. The row key represents a specific entity (e.g. a listing item in the market) and each row contains all features attributed to that entity. Each row contains multiple feature families of the non-relational database, and each feature family maps to a specific feature source (e.g. a MapReduce job or a database snapshot). This allows updating of each feature source independently as new data is written in. When querying features for model inference, only the relevant column families are fetched rather than the entire row.

The feature store 112 can store and provide two types of features: (1) batch features, and (2) real-time features, as explained below.

Batch features: A batch feature (e.g. revenue of a category, average price in a current month, or the like) is generated periodically through batch extract (rather than a real-time stream), transform, load (ETL) pipelines from static raw data (e.g. data on the disk). Such batch features can be asynchronously serialized based on the feature store schema (e.g. using APACHE Spark jobs) and write them into the feature store 112 (e.g. through Dataflow jobs). A schema, as referenced herein, defines the structure of a particular data format, the type of the data format, and the structure (through documentation) of how the data is organized. With a schema, data can be encoded more efficiently.

Real-time features: Unlike routinely-generated batch features, real-time features are usually generated by digesting, transforming and aggregating raw events (e.g. clicks by users in the electronic platform in real time) from a streaming platform (e.g. KAFKA). In other words, real-time features differ from batch features, for example, because real-time features are made available as data changes rather than waiting for a scheduled bath process in which all features are updated.

In some implementations, the real-time features can be split into two subtypes to minimize the overall latency, in which case two different feature services can be implemented. One feature service can update each entity with the most recent information (e.g. most recent price of an item being sold on an electronic platform). All the attribution operators touch only one entity (e.g. item being sold on the electronic platform) in a single operation. The pipeline probes the entity (e.g. item) change event, and updates the entity attributes (e.g. price of the item) in the feature store immediately after fetching the most recent information. The other feature service produces features that aggregate over fixed real-time windows to obtain high-level metrics on user-level interactions or listing-level interactions, such as user-recently-viewed listings, trending search queries, or the like. This feature service can produce aggregated features.

A model service 114 can retrieve (e.g. obtain) the one or more features for each candidate from the database (i.e. feature store) 112. The model service 114 can provide the one or more features for each candidate to at least one machine learning model (and thus generating a prediction) servicing the product service (e.g. search or another product service) specific to the browsing activity. The model service 114 can deploy the at least one machine learning model to generate an output. The output of the at least one machine learning model can be a score for each respective product component on the site (e.g. score of a listing on the search result, ordering of items in a recommendation, expected probability of a click for an item, and/or the like).

The ranking service 108 can select a portion of the machine learning output—e.g. a preset number of one or more scores (e.g. top 10 scores, top score, or the like). The ranking service 108 can store the selected portion of the machine learning output in a feature logger 116. The feature logger 116 is a streaming output sync that ingests particular features fetched at inference time for model prediction.

The features fetched at inference time are logged in a feature logger 116. In some implementations, it can be advantageous to locate the feature logger 116 within the ranking service 108, which can be a more optimal place for performing the logging as compared to within the feature service 110 or the model service 114, as within the ranking service one has access to entire metadata a request or query, information which may not be propagated to the feature or model service. As indicated above: the ranking service 108 is the central service that communicates with the feature service 110, candidate fetchers, and model service 114; the feature service 110 fetches features from the feature store 112, and is aware of the entities for which it is fetching the features, the feature value, and metadata; and the model service 114 runs the model inference to obtain scores, and knows the feature channels required by a model. It is advantageous to locate the feature logger 116 within the ranking service 108 because (a) the ranking service 108 contains centralized information from multiple services, so passing this information for logging is simpler, and (b) the ranking service 108 allows the feature logger 116 to be separated from the different services so the feature service 110 or model service 114 can be updated without rebuilding the feature logger 116.

The feature logger 116 can be a streaming platform producer (e.g. KAFKA producer) that can serialize and send records in a data serialization format (e.g. AVRO) to a streaming platform cluster (e.g. KAFKA cluster), matching a particular schema in the remote schema registry. It is an asynchronous call so logging does not affect the latency of the real-time ranking service 108. It also happens after the second-pass ranking so that features for only the top-k items that will be displayed to users of the platform can be fetched and logged, which can further optimize computing resources. It uses JSON for defining data types and protocols, and serializes data in a compact binary format. Generally, such formats provide both a serialization format for persistent data, and a wire format for communication between the nodes (e.g. HADOOP nodes in MapReduce jobs), and from client programs to the services (e.g. HADOOP services). The format can use a schema to structure the data that is being encoded. Use of such format can be beneficial because it can be well suited for streaming data, clearly indicates specific features that are available, and leverages the schema registry in implementations where a streaming platform 118 (e.g. KAFKA) is used for logging data from the ranking service.

The distributed event streaming platform 118 can log the user events based on browsing history of the user on the client device 106 in a first database 120, and can log ranker logs that include the portion of the machine learning output (e.g. top 10 scores) in a second database 122. Production logs can be prepared in batches. The event logs can be stored in a third database (which, in some implementations, can be a file in a cloud service) 123, and raw logs can be stored in a fourth database (which, in some implementations, can be a file in a cloud service) 124.

After the features have been logged, the features are associated with attributions, which are used as labels in the training data. Attributions are implicit feedback by the users for a given candidate (e.g. listing), such as a view, click, add to cart, and purchase. In some cases, the attributions may be determinable at request time (e.g. the view of a given listing may be determinable when the user makes a search query for an item in the listing). In few cases, the attributions may not be determinable at request time (e.g. where a user may click a listing but purchases the item much later (e.g. in an hour or the next day), the attribution of purchase may not be determinable at the time the user made a search query for an item in the listing. A batch attributor 125 (e.g. a particular tool in PYSPARK) can connect features (e.g. features specific to the top 10 scores) with user activities to produce additional signals for model enhancement and evaluation. The batch attributor 125 can store the additional signals as attributed logs in a database.

In order to capture more accurate attributions, the batch attributor job looks back at event logs in database (which, in some implementations, can be a file in a cloud service) 123 from a user session to decide the final attribution for each candidate. These events are fired by the application (e.g. electronic platform) based on user interactions (e.g. browsing activity). The attribution logic can be varied if needed. This batch attributor job can be triggered at preset intervals of time (e.g. daily), and can output attributions with a particular schema. This schema for attributions can include (a) request identifier, which can be a unique identifier associated with a ranking service request, (b) a candidate identifier, which can be a unique identifier for each candidate, and (c) attributions, which can include distinct interactions users performed on the candidate. These attributions can be later used as the label for training the ML model. The attributed logs can be stored in the database 126.

A sampler 127 (e.g. such as a tool in PYSPARK) can be used to reduce data size of the attributed logs. The sampler 127 can perform sampling on the attributed logs to determine (e.g. select or identify) a subset (e.g. a statistical sample) of data from within a larger set of statistical data to estimate characteristics of the larger set of data. The selected subset is expected to represent the entire data. Sampling advantageously allows for lower cost and faster machine learning. The type of sampling can be stratified sampling, which is a method of variance reduction by use of Monte Carlo methods to estimate statistics of a subset from a larger set of data. In stratified sampling, weights can be applied to the data to adjust for the sample design. For example, data weights can be varied by recency of browsing activity (e.g. give more weight to recent dates, and less weight to older dates). Similarly, weights can be varied by frequency. Although stratified sampling is described, in other implementations, other sampling methods can additionally or alternately be used, such as simple random sampling, systematic sampling, probability-proportional-to-size sampling, cluster sampling, quota sampling, minimax sampling, accidental sampling, voluntary sampling, line-intercept sampling, panel sampling, snowball sampling, theoretical sampling, and/or the like.

A database (e.g. multi-cloud serverless data warehouse, such as BIGQUERY or the like) 128 can store the output of the sampler 127. Such output includes training instances used for training the models.

Training a new model on features that already exist in the logged data is similar to training the production model. However, it is advantageous to train a model on data that has not been logged yet. Logging can be performed in two ways: (1) front-fill, and (2) back-fill. In front-fill logging, the system starts logging the data and waits for the full training window before the first model is trained. If planned sufficiently, front-fill can still allow fast iteration cycles, but if there is a long training window, there may be a wait of a long time (e.g. several weeks). In back-fill logging, the system regenerates older data by joining in the new features. This allows starting experimenting with the features sooner rather than later, and the system can validate a feature before incurring the cost of logging it. A feature joiner 130 (which can be prepared with PYSPARK) can regenerate older data by joining in the new features using the back-fill process. This back-fill process allows utilization of features sooner rather than later, as the system is not required to start logging the data and wait (e.g. few weeks) for the full training window before the model can be trained as is the case for a front-fill process, and thus supports faster iteration cycles. The back-fill process thus allows validation of a feature before incurring the cost of logging it. The feature joiner 130 receives the training instances from the database (e.g. multi-cloud serverless data warehouse) 128 and joins in features from different feature sources obtained from the database 132, which thus avoids recomputing the full set of features, thereby preserving computing resources. The feature joiner 130 can generate updated training instances obtained by the joining process.

To support faster iteration cycles, the feature joiner 130 (which can be prepared with PYSPARK) can perform back-filling logging. This joiner 130 takes the production training data (generated by the ranking service logger) and joins in features from different sources in database 132. This avoids recomputing the full feature set. The feature joiner takes in a configuration file (e.g. YAML configuration file, wherein YAML is a human-readable data serialization standard that can be used in conjunction with programming languages and is often used to write configuration files) that specifies the training data and a list of features to join in.

The joiner 130 can tackle two problems often faced with PYSPARK or similar interfaces: (a) data skewness and (b) garbage collection inefficiency. The joining process is split into 3 steps to address the problems: (1) Extract keys: each feature to join specifies a key in the training data to join on. The system gathers a set of such keys and extracts them from the training data. This ensures minimal data is required to perform the joins. (2) Join features: the system joins the features from multiple sources to the corresponding key extracted from the previous step and saves them into a temp file. (3) Join back the training instances: the joined product in the temp file is joined back with the original training instances on the key set.

A database 134 can store the updated training instances output by the joiner 130. The model service 114 can use the updated training instances for training one or more ML models.

The feature sources 132 can be of multiple types, files on a distributed file system generated by ETL jobs such as in SPARK, SCALDING, or the like, or these features can be snapshots of other databases. The feature sources 132 can be transformed into an acceptable format such as concise binary object representation (CBOR) through a map only job in an ETL tool such as GOOGLE DATAFLOW, SPARK, SCALDING, or the like, and then written to the database (i.e. feature store) 112. The term dataflow, as used herein, can refer to as stream processing or batch processing done for the incoming feature data before it can be parsed by the feature store database.

A real-time hydration system 144 can update data stored within the feature store 112 based on real-time changes to data stored in a relational database management system (RDBMS; e.g. MySQL) 140. On large scale electronic platforms, the production backend of the digital platform can be powered by a large web scale database, where the key datasets for business operation are stored. Such a database may provide data to one or more (e.g. all) applications connected to that database. The feature store is one such application which uses a change-data-capture to read any changes to important business data to make modifications to the data stored in the feature bank. For example, when a seller selling items over the electronic platform changes the price of their listing, the MySQL database changes first and completes the database transaction, triggering a change data capture (CDC) event, which can be ingested by the feature bank to reflect the updated price of a listing, and eventually read by the ranking service as the new price of the listing.

The real-time changes can be stored separately in a change log 142 (generally powered by a streaming system such as KAFKA), which is shown outside the relational database management system 140 for clarity. When changes are to be performed, only row cells specific to changed data are updated instead of replacing the entire row, which in turn minimizes the write traffic for the change.

Before migrating to the new training data, regular (e.g. daily) validations can be set up to track and monitor data quality. The system can check for the following to ensure data quality: (a) duplicated records or instances, (b) missing records including missing requests and features from real-time logger; which can be contributed by runtime logger errors, (c) coverage of the same feature set in both the feature logging based training data set and the old ETL based training data set, and (d) discrepancies within an allowable range of feature value, which can be determined by comparing the basic statistics (e.g., mean, medium, standard deviation, and/or the like) on the features between the feature logging based training data and the production ETL training data set, and such discrepancies can occur because the feature sources could be different and they could depend on different days of the same source. This real-time validation can help diagnose any training serving skew (which can often occur in real-time), thereby assisting the teams in addressing the bugs as soon as those teams are alerted, which prevents the electronic platform from displaying degraded model quality results to the users of the electronic platform.

Figure 2:
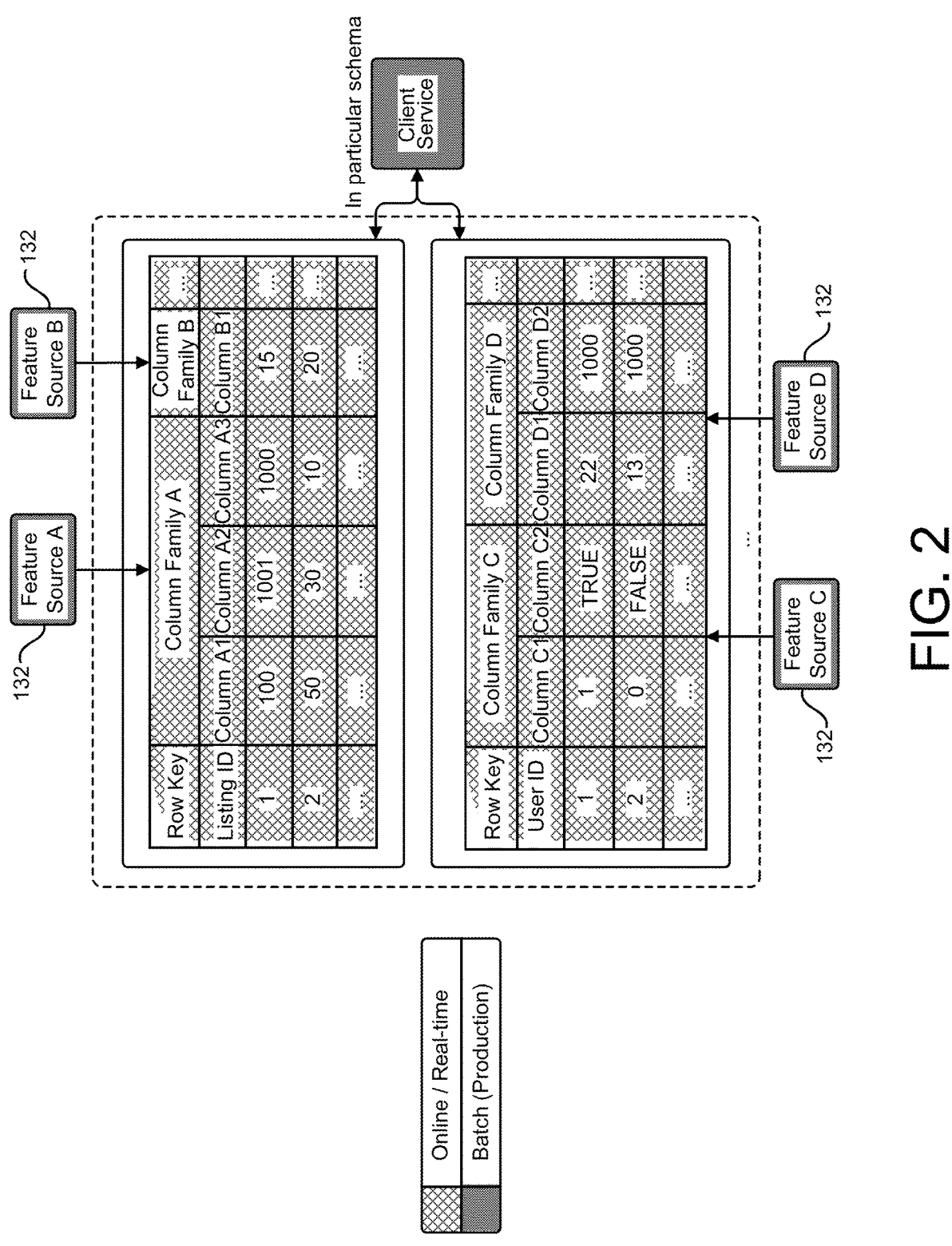
FIG. 2 illustrates an example architecture of a feature store within the pipeline of FIG. 1.

FIG. 2 illustrates an example architecture of the feature store 112. The feature store 112 can be a column-based distributed non-relational (e.g. NoSQL) database—such as Bigtable, DynamoDB or Hbase—with independent columnar updates and a feature subset filtering mechanism. Each feature source in database 132 corresponds to a column family in the column-based distributed non-relational (e.g. NoSQL) database. The client library can fetch features by row key (the unique ID for the entity). The row key represents a specific entity (e.g. a listing item in the market) and each row contains all features attributed to that entity. Each row contains multiple feature families of the non-relational database, and each feature family maps to a specific feature source (e.g. a MapReduce job). This allows updating of each feature source independently as new data is written in. When querying features for model inference, only the relevant column families are fetched rather than the entire row, which allows the feature store database to continue to perform effectively and ensures that query latency remains under control as the amount of data over wire and deserialized-serialized is minimized.

The feature store 112 can store and provide two types of features: (1) batch features, and (2) real-time features, as explained below.

Batch features: A batch feature (e.g. revenue of a category, average price in a current month, or the like) is generated periodically through batch extract, transform, load (ETL) pipelines from static raw data (e.g. data on the disk). Such batch features can be asynchronously serialized based on the feature store schema (e.g. using APACHE Spark jobs) and write them into the feature store 112 (e.g. through Dataflow jobs). A schema, as referenced herein, defines the structure of a particular data format, the type of the data format, and the meaning (through documentation) of the data. With a schema, data can be encoded more efficiently.

Real-time features: Unlike routinely-generated batch features, real-time features are usually generated by digesting, transforming and aggregating raw events from a streaming platform (e.g. KAFKA). In some implementations, the real-time features can be split into two subtypes to minimize the overall latency, in which case two different feature services can be implemented. One feature service can update each entity with the most recent information (e.g. the most recent price of an item being sold on an electronic platform), similar to the real-time hydrating stream reading from change data capture, as noted above. All the attribution operators touch only one entity (e.g. item being sold on the electronic platform) in a single operation. The pipeline probes the entity (e.g. item) change event, and updates the entity attributes (e.g. price of the item) in the feature store immediately after fetching the most recent information. The other feature service produces features that aggregate over fixed real-time windows to obtain high-level metrics on user-level interactions or listing-level interactions, such as user-recently-viewed listings, trending search queries, or the like. This feature service can produce aggregated features.

Figure 3:
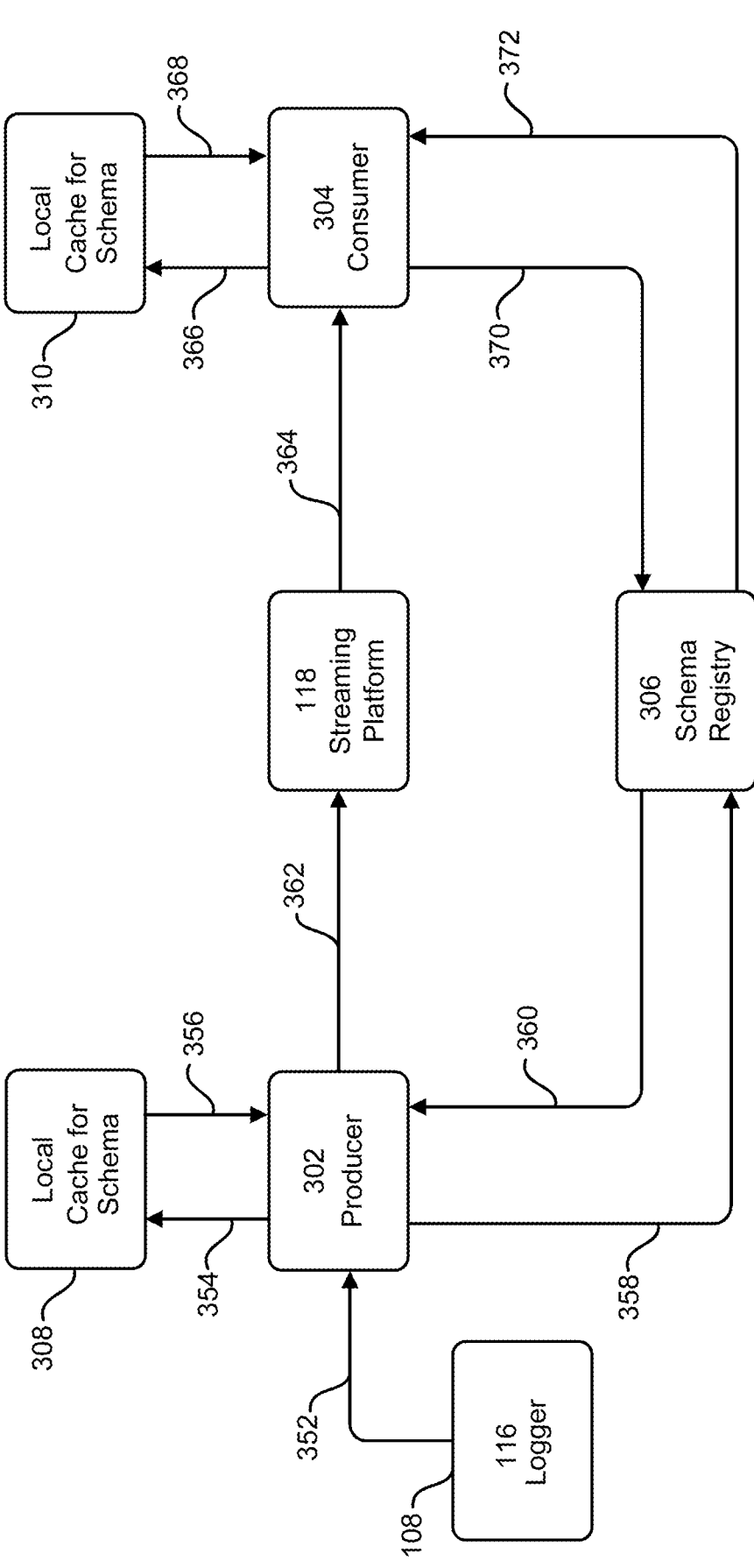
FIG. 3 illustrates example process of using multiple schemas by a logging (e.g. streaming) platform within the pipeline of FIG. 1.

Several sets of schemas are established across different development teams that improve data consistency across those development teams. A schema allows the feature data to be fed (i.e. provided) into a predefined "matrix" and shaped to a designated structure for digesting. This enables training on data from different pipelines. For example, a new model may be easily trainable with both web application and mobile application training data because those two applications share the same schema. FIG. 3 illustrates example process of using multiple schemas by the streaming platform (e.g. KAFKA) 118.

The streaming platform 118 has a producer 302, a consumer 304, and a schema registry 306. The producer 302 is a client application that publishes (e.g. writes) events to the streaming platform 118, and the consumer 304 is a client application that subscribes to (e.g. reads and processes) these events. In the streaming platform 118, the producer 302 and the consumer 304 are fully decoupled and agnostic of each other, which allows the streaming platform 118 to attain high scalability. For example, the producer 302 never needs to wait for the consumer 304. The schema registry 306 manages the event schemas and maps the schemas to topics, so that the producer 302 knows which topics are accepting which types (e.g. schemas) of events, and the consumer 304 knows how to read and parse events in a topic. The schema registry 306 further provides the functionality of schema evolution by enforcing compatibility rules, and allows the producer 302 to send the schema identifier instead of the original schema, which reduces the payload.

The producer 302 can receive, at 352 from the ranking service 108, a record and the schema from the schema registry. The producer 302 can transmit, at 354, the schema to the local cache 308. The producer 302 can receive, at 356 from the local cache 308, either a schema identifier or an indication that the local cache 308 does not have the schema identifier. If the local cache 308 indicates that it does not have the schema identifier, the producer 302 can ask, the schema registry 306 for the schema using the schema identifier. The producer 302 can transmit, at 362, the record to the streaming platform 118 and send the data in the format specified by the schema. The streaming platform 118 can transmit, at 364 to the consumer 304, the record. The consumer 304 can transmit, at 366 to the local cache 310, the schema identifier to find the schema. The consumer 304 can receive, at 368 from the local cache 310, either the schema or an indication that the local cache 310 does not have the schema. If the consumer 304 receives such indication that that the local cache 310 does not have the schema, the consumer transmits, at 370, the schema identifier to the schema registry 306 to obtain the schema at 372. The consumer 304 can receive, at 264, the record and parse it with the fetched schema.

In some implementations, the schema can be in the format of a row-oriented remote procedure call and data serialization framework (e.g. AVRO or another similar format). Such format can use JSON for defining data types and protocols, and can serialize data in a compact binary format. This can provide both a serialization format for persistent data, and a wire format for communication between nodes (e.g. HADOOP nodes), and from client programs to services (e.g.

HADOOP services). The format can use a schema to structure the data that is being encoded. Such format can be well suited for streaming data, can indicate specific features that are available, and can leverage the schema registry in implementations where the streaming platform 118 is used for logging data from the ranking service. Note that references to AVRO, HADOOP and KAFKA are used for purposes of example only, and that the pipeline techniques discussed and claimed herein can be used in a variety of environments.

Figure 4:
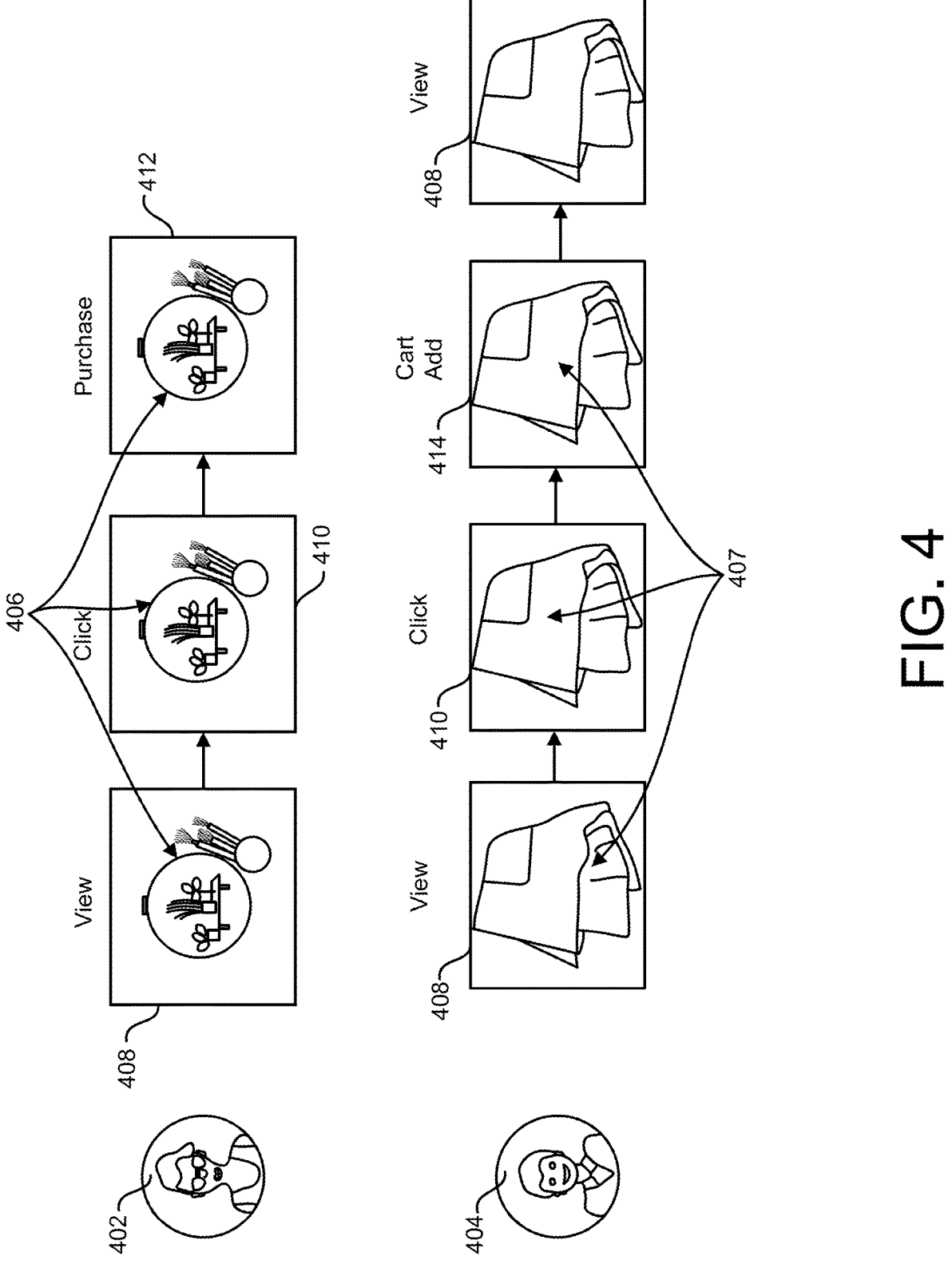
FIG. 4 illustrates various events associated with two different users and products presented to them on the electronic platform respectively and their corresponding interactions with those products.

FIG. 4 illustrates various events associated with two different users and respective products for which digital components are presented on the electronic platform. The phrase "digital component," as used throughout this document, refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component.

After the features have been logged, the features are associated with attributions, which are used as labels in the training data. Attributions can be understood as implicit feedback by the users (e.g. 402, 404) for a given corresponding candidate (e.g. listing) (e.g. candidate 406, 407), such as a view 408, click 410, purchase 412, and add to cart 414. Some attributions may be determinable at request time, e.g., the view 408 of a given listing 406 or 407 may be determinable when the user makes a search query for an item in the listing 406. Most attributions are not determinable at request time, e.g., where a user may click 410 a listing 406 or 407 but purchases the item much later (e.g. in an hour or the next day), the attribution of purchase may not be determinable at the time the user made a search query for an item in the listing 406 or 407. A batch attributor 125 (e.g. a particular tool in PYSPARK) can connect features (e.g. features specific to the top 10 scores) with user activities to produce labels for model training and evaluation. The batch attributor 125 can store the augmented dataset (which includes features and labels) as attributed logs in a database 126.

The database 126 thus stores attributed logs in a format that combines features (as obtained from database or file 124) and attributions (which are representative of events, such as 408, 410 and 412, data regarding which is obtained from the database or file 123). Such attributed logs can be have two example representations—one shown in FIG. 5, and another shown in FIG. 6. The representation of FIG. 5 is referenced as Attributed Instance 502, and the representation of FIG. 6 is referenced as Attributed RequestState 602.

Figure 5:
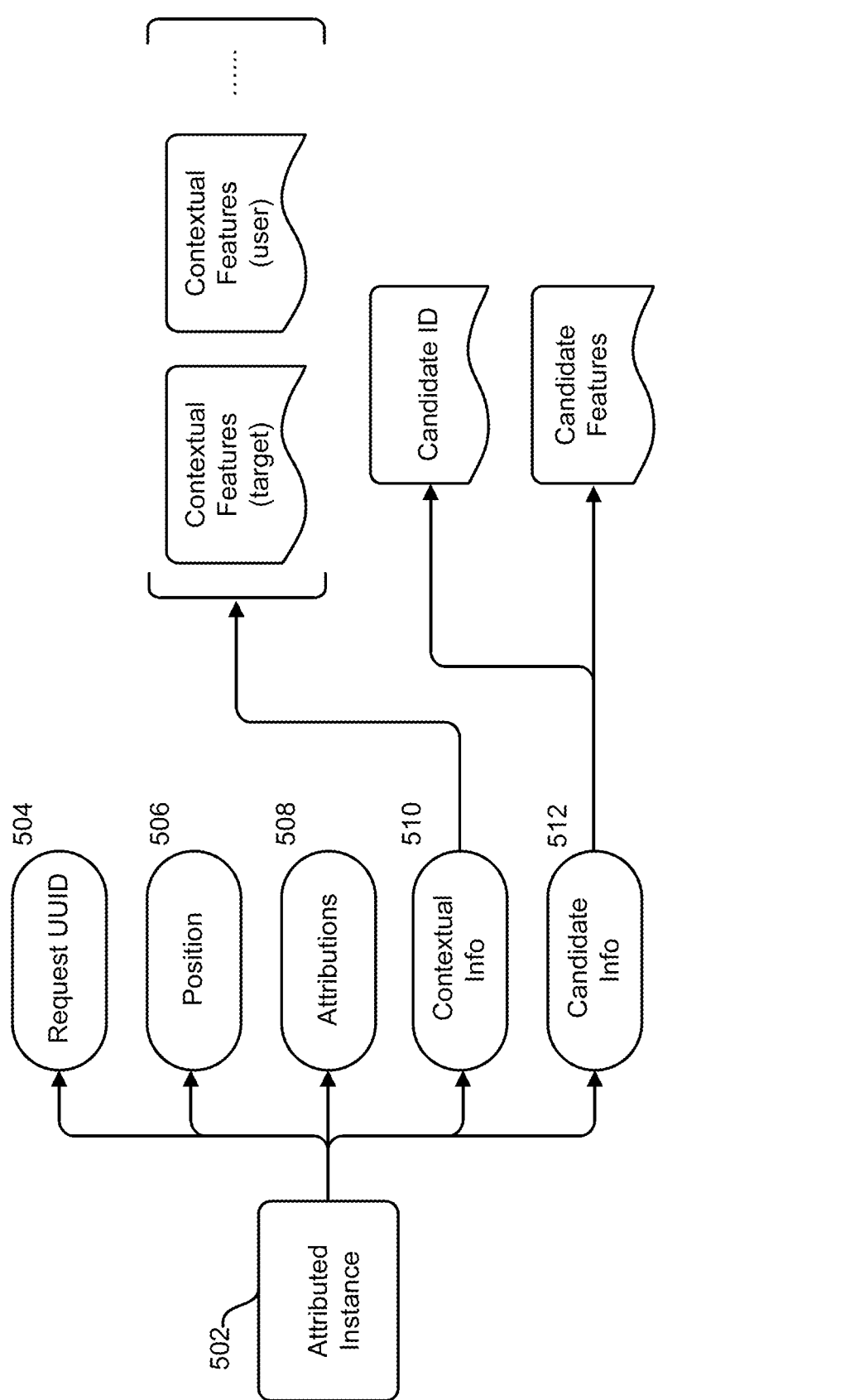
FIGS. 5 and 6 illustrate example representations of attributed logs stored in the pipeline of FIG. 1.

FIG. 5 illustrates the representation Attributed Instance 502. Each record with the representation 502 in the attributed log can contain the request identifier (which can be a request unique universal identifier, referred to as Request UUID) 504 associated with this instance, the position 506 of this instance when the instance was displayed to the user, attributions 508 associated with this instance (which include a list of all the distinct interactions the user had with this instance), contextual information 510 (which includes all the fetched features for the request that may not be specific for this instance), and candidate information 512 (which includes all the features for this instance). These attributed instances can be used for training models. Specifically, the attributions 508 can be the labels for training, and the position 506 and features 510 and 512 can be used as inputs.

Figure 6:
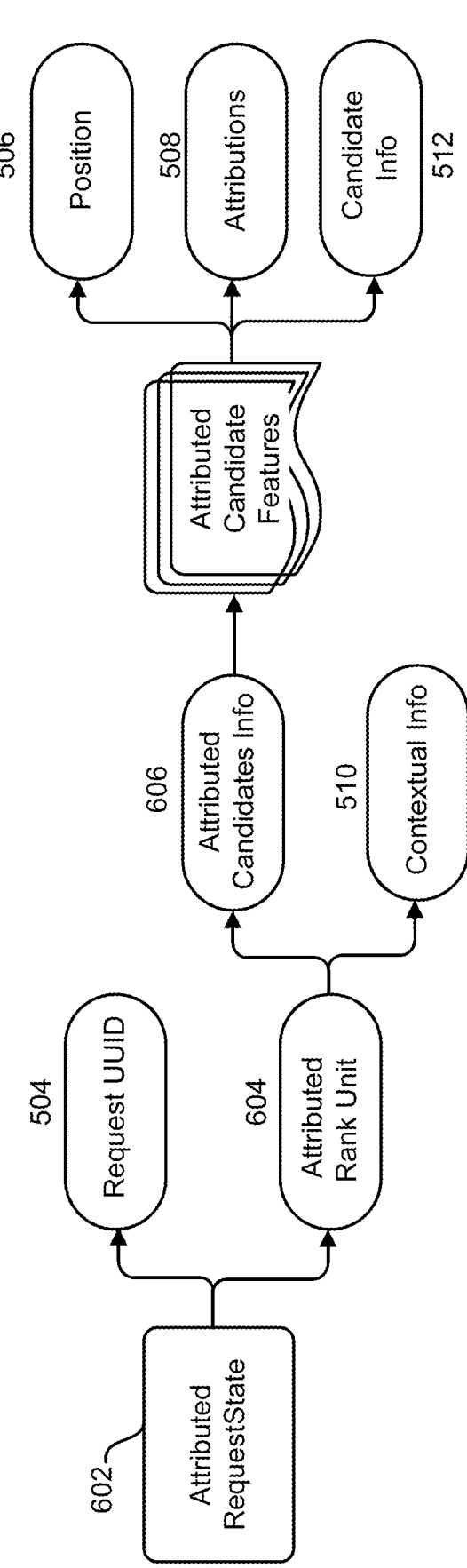

FIG. 6 illustrates the representation Attributed RequestState 602. Each record with the representation 602 in the attributed log contains the identifier 504 for this request, and an attributed representation of the ranking 604 as was shown to the user of the electronic platform. This attributed representation of the ranking 604 contains contextual features 510 from non-candidate sources, and features 606 of each of the candidates with attributions. Each candidate has its position 508, attributions 510, and candidate features 512. The representation 602 can contain information equivalent to multiple attributed instances 502. Each candidate within information 606 can map to one attributed instance 502, and respective position 506, attributions 508, and candidate information 512. The request UUID 504 and contextual information 510 are the same across the request, which is the reason why they exist only once in the representation 602 and must be copied to each attributed instance 502. The representation 602 is obtained by analyzing the requests from the users on the electronic platform, and the representation 602 is converted to the representation 502 for ease of training models, as training does not need to consume all of the requests at once.

Figure 7:
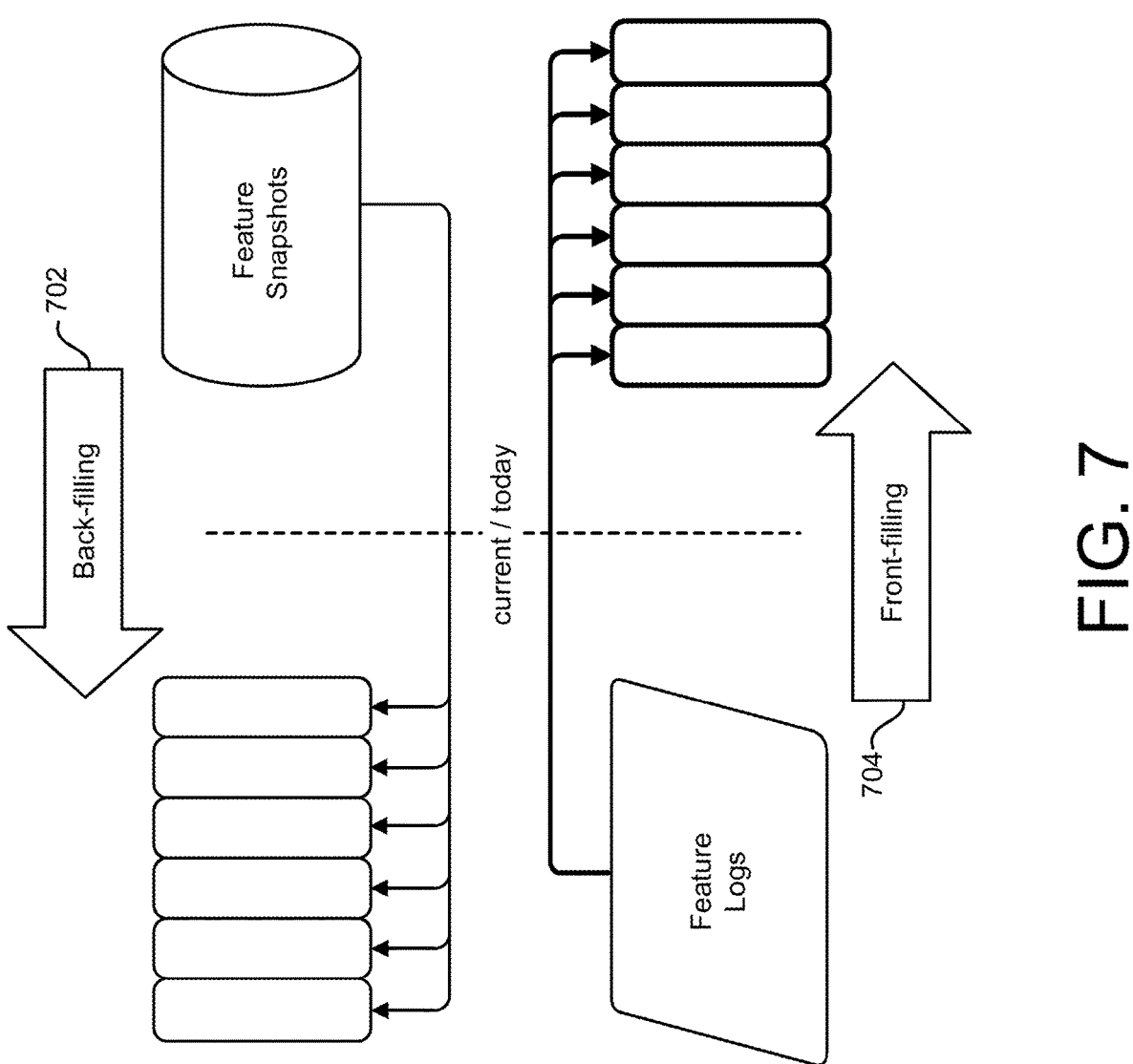
FIG. 7 illustrates example logging of feature data by way of back-filling 702 versus front-filling.

FIG. 7 illustrates logging of feature data by way of back-filling 702 versus front-filling 704. Generation of training data can be performed in two ways: (1) back-filling 702, and (2) front-filling 704. The back-filling 702 generates the training data for the past dates by joining the new data with the old records. The front-filling 704 starts logging the new feature with feature logging, which are joined with attributions (as described above) to get training data for the future modeling.

More particularly, in front-filling 704, the system starts logging the data and waits for the full training window before the first model is trained. If planned sufficiently, front-filling 704 can allow fast iteration cycles, but if there is a long training window, there may be an undesirably long waiting time (e.g. several weeks). In back-fill logging 702, the system regenerates older data by joining in the new features. This allows starting experimenting with the features sooner rather than later, and the system can validate a feature before incurring the cost of logging it. A feature joiner 130 (which can be prepared with PYSPARK) can regenerate older data by joining in the new features using the back-fill process. This back-filling 702 allows utilization of features sooner rather than later, as the system is not required to start logging the data and wait (e.g. few weeks) for the full training window before the model can be trained as is the case for a front-fill process 704, and thus supports faster iteration cycles. The back-fill process 702 thus allows validation of a feature before incurring the cost of logging it. The feature joiner 130 receives the training instances from the database 128 and joins in features from different feature sources obtained from the database 132, which thus avoids recomputing the full set of features, thereby preserving computing resources. The feature joiner 130 can generate updated training instances obtained by the joining process.

Figure 8:
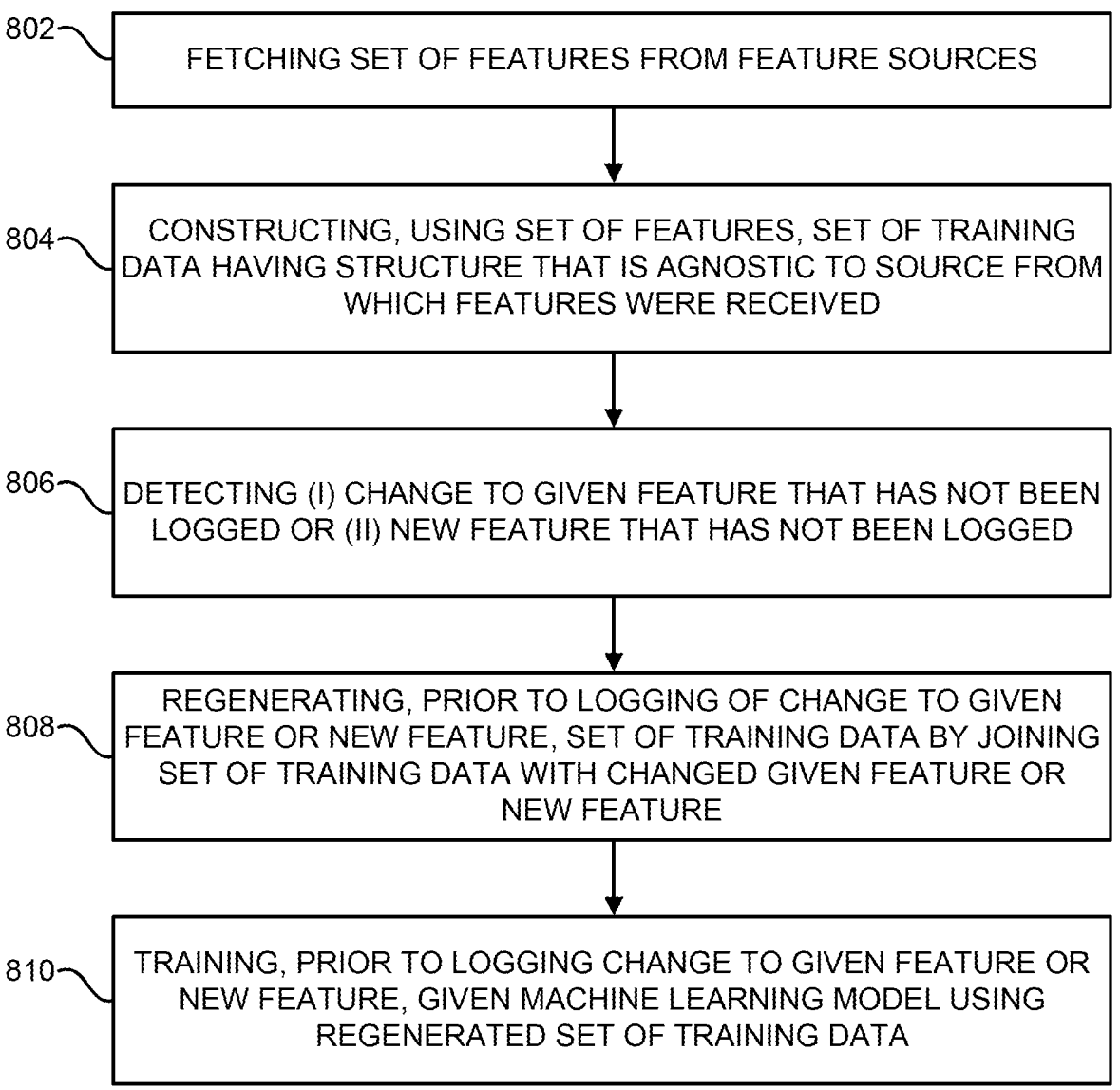
FIG. 8 is a flow-diagram illustrating a process of training machine learning models used by various product areas of teams of an electronic platform Like reference symbols in the various drawings indicate like elements.

FIG. 8 is a flow-diagram illustrating a process of training machine learning models used by various product areas of teams of an electronic platform (e.g. website). One or more data processing apparatuses can fetch, at 802 and over a network, a set of features from a plurality of feature sources 132. The one or more data processing apparatuses can construct, at 804 using the set of features, a set of training data having a structure that is agnostic to a source from which the features were received. The one or more data processing apparatuses can detect, at 806, (i) a change to a given feature among the set of features that has not been logged in the set of features or (ii) a new feature that has not been logged in the set of features. The one or more data processing apparatuses can regenerate, at 808 and prior to logging of the change to the given feature or the new feature, the set of training data by joining the set of training data with the changed given feature or the new feature. The one or more data processing apparatuses can train, at 810 and prior to logging the change to the given feature or the new feature, a given machine learning model using the regenerated set of training data.

The constructing of the set of training data can include: combining, by the one or more data processing apparatuses, the set of features with a browsing event data to generate combined data; sampling, by the one or more data processing apparatuses, the combined data to generate sampled data, wherein the sampled data is presented in a format having a structure that is agnostic to a feature source from which the set of features was fetched; and joining, by the one or more data processing apparatuses, the sampled data with old features by a back-filling process to generate training data designed to train one or more machine learning models. The one or more machine learning models can be used to make predictions for respective one or more product areas of an electronic platform. The sampling can include stratified sampling that applies weights to the set of features within the combined data. The weights can vary based on one or more of recency or frequency of the browsing activity.

The set of features can include (i) batch features and (ii) streaming features that are updated more often than the batch features. The batch features can be stored in a first set of columns, and the streaming features can be stored in a second set of columns. The second set of columns can be updated more often than the first set of columns.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can display data to one or more users on a display device, such as a cathode ray tube (CRT) device, a liquid crystal display (LCD) monitor, a light emitting diode (LED) monitor, or any other display device. The computer can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser or mobile web application, through which a user can interact with an implementation of the subject matter described herein. The components of the system can be interconnected by any form or medium of digital data communication, such as a communication network. Examples of communication networks can include a local area network, a wide area network, internet, intranet, Bluetooth network, infrared network, or other networks.

The computing system can include clients and servers. A client and server can be generally remote from each other and can interact through a communication network. The relationship of client and server can arise by virtue of computer programs running on the respective computers and having a client-server relationship with each other.

Although a few variations have been described in detail above, other modifications can be possible. For example, the logic flows depicted in the accompanying figures and described herein do not require the particular order shown, or sequential order, to achieve desirable results. Other embodiments may be within the scope of the following claims.

The invention claimed is:

1. A method comprising:

fetching, by one or more data processing apparatuses and over a network, a set of features from a plurality of feature sources;

constructing, by the one or more data processing apparatuses and using the set of features, a set of training data having a structure that is agnostic to a source from which the features were received;

detecting, by the one or more data processing apparatuses, that (i) a change has occurred to a given feature, among the set of features that were used to construct the set of training data, that has not been logged in the set of features or (ii) a new feature exists that has not been logged in the set of features;

regenerating, by the one or more data processing apparatuses and prior to logging of the change that occurred to the given feature or the new feature that exists, the set of training data by joining the set of training data with the detected (i) change that occurred to the given feature or (ii) the new feature that exists, wherein the joining is performed based on a key of the training data;

training, prior to logging the detected change to the given feature or the new feature that exists, a given machine learning model using the regenerated set of training data; and logging the change that occurred to the given feature or the new feature.

2. The method of claim 1, wherein the constructing of the set of training data comprises:

combining, by the one or more data processing apparatuses, the set of features with a browsing event data to generate combined data;

sampling, by the one or more data processing apparatuses, the combined data to generate sampled data, wherein the sampled data is presented in a format having a structure that is agnostic to a feature source from which the set of features was fetched; and joining, by the one or more data processing apparatuses, the sampled data with old features by a back-filling process to generate training data designed to train one or more machine learning models.

3. The method of claim 2, wherein the one or more machine learning models are configured to be used to make predictions for respective one or more product areas of an electronic platform.

4. The method of claim 2, wherein the sampling comprises stratified sampling that applies weights to the set of features within the combined data, wherein the weights vary based on one or more of recency or frequency of browsing activity within the browsing event data.

5. The method of claim 1, wherein the set of features include (i) batch features and (ii) streaming features that are updated more often than the batch features.

6. The method of claim 5, wherein the batch features are stored in a first set of columns, wherein the streaming features are stored in a second set of columns, wherein the second set of columns are updated more often than the first set of columns.

7. A system comprising:

at least one programmable processor; and a machine-readable medium storing instructions that, when executed by the at least one programmable processor, cause the at least one programmable processor to perform operations comprising:

fetching, over a network, a set of features from a plurality of feature sources;

constructing, using the set of features, a set of training data having a structure that is agnostic to a source from which the features were received;

detecting that (i) a change has occurred to a given feature, among the set of features that were used to construct the set of training data, that has not been logged in the set of features or (ii) a new feature exists that has not been logged in the set of features;

regenerating, prior to logging of the change that occurred to the given feature or the new feature that exists, the set of training data by joining the set of training data with the detected (i) change that occurred to the given feature or (ii) the new feature that exists, wherein the joining is performed based on a key of the training data;

training, prior to logging the detected change to the given feature or the new feature that exists, a given machine learning model using the regenerated set of training data; and logging the change that occurred to the given feature or the new feature.

8. The system of claim 7, wherein the constructing of the set of training data comprises:

combining the set of features with a browsing event data to generate combined data;

sampling the combined data to generate sampled data, wherein the sampled data is presented in a format having a structure that is agnostic to a feature source from which the set of features was fetched; and joining the sampled data with old features by a back-filling process to generate training data designed to train one or more machine learning models.

9. The system of claim 8, wherein the one or more machine learning models are configured to be used to make predictions for respective one or more product areas of an electronic platform.

10. The system of claim 8, wherein the sampling comprises stratified sampling that applies weights to the set of features within the combined data, wherein the weights vary based on one or more of recency or frequency of browsing activity within the browsing event data.

11. The system of claim 7, wherein the set of features include (i) batch features and (ii) streaming features that are updated more often than the batch features.

12. The system of claim 11, wherein the batch features are stored in a first set of columns, wherein the streaming features are stored in a second set of columns, wherein the second set of columns are updated more often than the first set of columns.

13. One or more non-transitory computer program products storing instructions that, when executed by at least one programmable processor, cause the at least one programmable processor to perform operations comprising:

fetching, over a network, a set of features from a plurality of feature sources;

constructing, using the set of features, a set of training data having a structure that is agnostic to a source from which the features were received;

detecting that (i) a change has occurred to a given feature, among the set of features that were used to construct the set of training data, that has not been logged in the set of features or (ii) a new feature exists that has not been logged in the set of features;

regenerating, prior to logging of the change that occurred to the given feature or the new feature that exists, the set of training data by joining the set of training data with the detected (i) change that occurred to the given feature or (ii) the new feature that exists, wherein the joining is performed based on a key of the training data; and training, prior to logging the detected change to the given feature or the new feature that exists, a given machine learning model using the regenerated set of training data; and logging the change that occurred to the given feature or the new feature.

14. The one or more non-transitory computer program products of claim 13, wherein the constructing of the set of training data comprises:

combining the set of features with a browsing event data to generate combined data;

sampling the combined data to generate sampled data, wherein the sampled data is presented in a format having a structure that is agnostic to a feature source from which the set of features was fetched; and joining the sampled data with old features by a back-filling process to generate training data designed to train one or more machine learning models.

15. The one or more non-transitory computer program products of claim 14, wherein the one or more machine learning models are configured to be used to make predictions for respective one or more product areas of an electronic platform.

16. The one or more non-transitory computer program products of claim 14, wherein the sampling comprises stratified sampling that applies weights to the set of features within the combined data, wherein the weights vary based on one or more of recency or frequency of browsing activity within the browsing event data.

17. The one or more non-transitory computer program products of claim 13, wherein the set of features include (i) batch features and (ii) streaming features that are updated more often than the batch features.

18. The one or more non-transitory computer program products of claim 17, wherein the batch features are stored in a first set of columns, wherein the streaming features are stored in a second set of columns, wherein the second set of columns are updated more often than the first set of columns.

\* \* \* \* \*